United States Patent Office

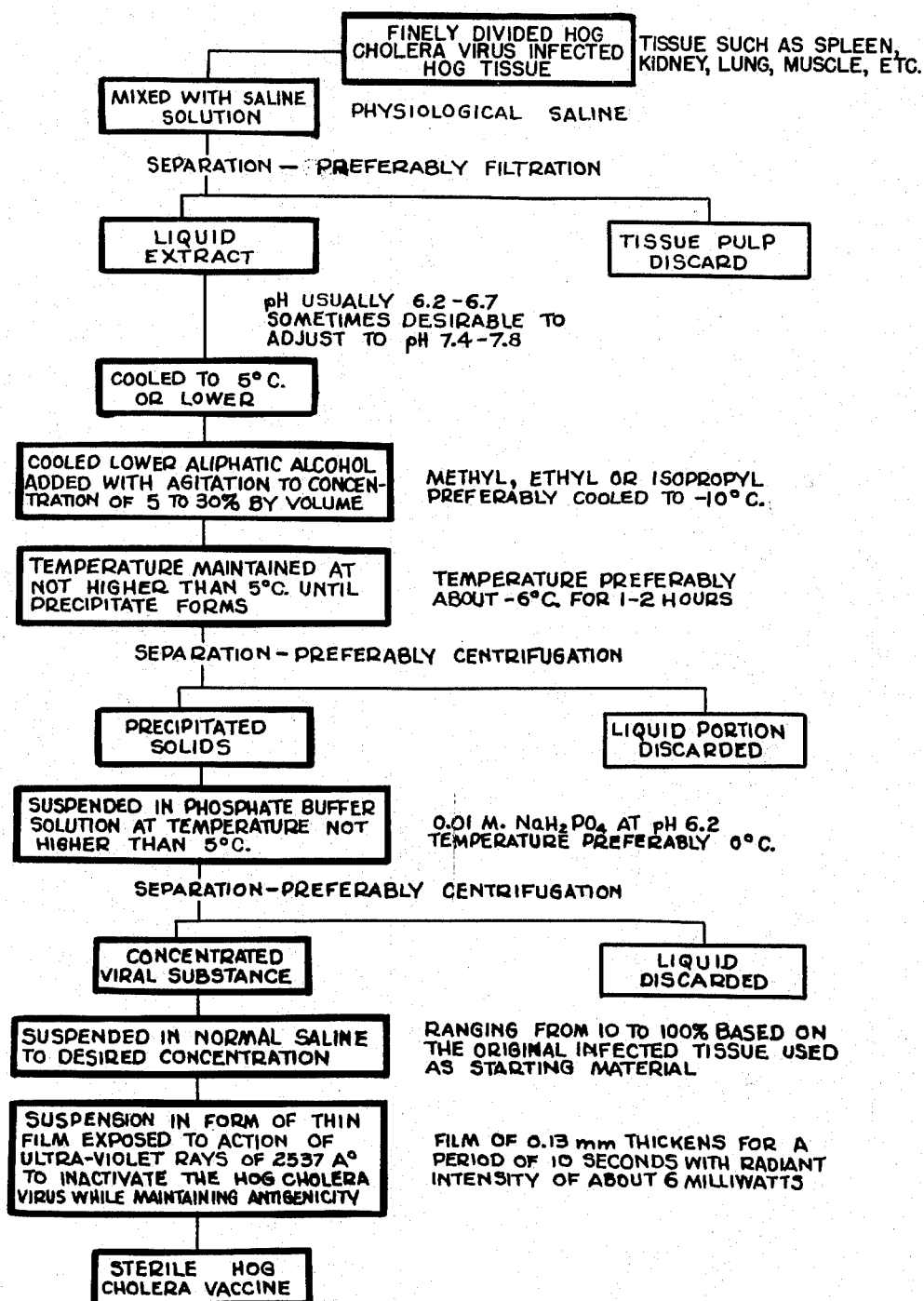

2,720,485
Patented Oct. 11, 1955

2,720,485

PREPARATION OF CONCENTRATED, PURIFIED ULTRAVIOLET INACTIVATED HOG CHOLERA VACCINE

Alfred H. Brueckner, Zionsville, Carl M. Meadows and William S. Gochenour, Indianapolis, and Raymond B. Gochenour, Westfield, Ind., assignors to Allied Laboratories, Inc., Kansas City, Mo., a corporation of Delaware Application February 16, 1950, Serial No. 144,582

6 Claims. (Cl. 167—80)

This invention relates to vaccines and methods for their production. More particularly it relates to a vaccine for immunizing swine against hog cholera.

In the past, vaccines prepared from tissues obtained from swine infected with cholera have generally used chemical substances for killing the virus. These chemically inactivated hog cholera tissue vaccines have not been entirely satisfactory. Among the unsatisfactory features of them has been that the high protein content necessitates the use of relatively large amounts of formaldehyde, phenol, or other chemical inactivators. In spite of the use of the relatively large amounts of formaldehyde or phenol or the like, the vaccines frequently were non-sterile and had low antigenic properties. It is thought that the high protein content of the infected tissue material interferes with the action of the inactivating chemical and produces variable results.

The chemical inactivating substances, in general, are protein denaturants so may continue to affect the virus over an extended period of time. The prolonged contact of the formaldehyde, phenol and the like with the virus material may destroy the antigenic properties of the vaccine. Also the chemical substances remaining in the vaccine tend toward tissue irritation and abcess formation following injection.

Some attempts have been made in the past to use ultra-violet irradiation for the production of a hog cholera vaccine to supplant the use of the indesirable chemical inactivating substances. Even though a commercially satisfactory rabies vaccine has been prepared by ultra-violet irradiation, there has been no successful commercial production of a hog cholera vaccine by ultra-violet irradiation, and it is reasonable to assume that the conditions for irradiating rabies virus have not in the past been suited to hog cholera virus vaccines.

Hog cholera virus vaccines of tissue origin have, in the past, been made from the spleen or similar tissues having a relatively high virus content. In spite of the fact that the spleen and similar tissues have a relatively high virus content, it is generally necessary to use aqueous suspensions containing 20–30% of the tissues in order to obtain vaccines of the desired antigenic potency. The high tissue content precludes the use of ultra-violet irradiation since the tissue not only absorbs the light waves, but also prevents uniform contact with the virus. It is believed that it would be absolutely impossible to uniformly inactivate hog cholera virus, with ultraviolet light, in aqueous suspensions containing more than 5–10% tissue solids. In our process we can concentrate the hog cholera viral substance to such an extent that aqueous suspensions containing up to the equivalent of 100% of the original tissues are obtained and uniformly inactivated by ultra-violet light to produce a potent vaccine. Furthermore, we are not limited to the use of the spleen and similar tissues because we can use all the virus bearing tissues of the hog, selectively or in mixtures using the proportions as they occur in the carcass or the like. Economically this is very important because in the past, the bulk of the tissues from the infected swine used in vaccine production has been a total loss.

In accordance with the present invention, we have discovered a process involving a series of steps which result in the production of an extremely satisfactory hog cholera vaccine by ultra-violet irradiation. In principle, our method comprises the purification and concentration of a virulent hog cholera virus and irradiation of an aqueous suspension of the virus using certain specific conditions which results in the complete inactivation of the virus and at the same time retention of its antigenicity.

The following is a general description of the invention:

The virus containing tissues obtained from animals infected with hog cholera are ground or homogenized and mixed with an aqueous solution or a buffered physiological saline solution. After thorough mixing, the fluids are separated from the tissue pulp and the virus containing fluids are used for further processing. The above extraction can be carried out at room temperatures or at lower temperatures.

The fluid extract containing the virus usually has a pH of from about 6.2–6.7 and can be used without further adjustment. On the other hand, we have found, in certain instances, that it is desirable to adjust the pH to from about 7.4–7.8. The extracted fluids are cooled to a temperature of about 5° C. or lower and a lower aliphatic alcohol such as methyl, ethyl, or isopropyl is added slowly with moderate and continuous agitation to a concentration of about 5% to 30% by volume. The alcoholic solution is cooled prior to the mixing so that the temperature of the mixture is kept lower than 5° C. The mixture is maintained at a temperature lower than 5° C. (preferably about −6° C.) to allow the formation of a precipitate. The precipitate comprising a mixture of the virus and animal proteins is collected by any suitable means, preferably by centrifugation. The collected precipitate is mixed with distilled water or 0.01 M $NaH_2PO_4$ solution at a temperature lower than 5° C., preferably 0° C., and stirred until a homogeneous suspension is obtained. This suspension is centrifuged while still being maintained at a temperature lower than 5° C., resulting in the collection of a hog cholera virus containing precipitate from which a major proportion of the alcohol and a considerable amount of the inert material has been separated. This material comprises our concentration hog cholera virus containing substance and may be suspended in sufficient saline solution to effect any desired degree of concentration, usually ranging from 10% to 100%, based on the original infected tissue material used. This final concentrate is then stirred until it forms a uniform suspension and is screened through bolting silk. The final suspension is exposed to radiant energy to utilize viricidal properties of ultra-violet light 2537 A. wavelength. The amount of radiant energy to which the suspension is subjected is determined by titration of similar material. Such titration is necessary since it has been found that the optimum exposure for preservation of antigenicity falls within rather narrow limits. Usually the exposure is for about 10 seconds in a film of approximately 0.13 mm. employing a radiant intensity of approximately 6 milliwatt seconds per sq. cm. Exposure is carried out to achieve a minimal intensity as well as time of irradiation, and to provide for exposure of all particles.

The following specific example will serve to illustrate our invention in more detail:

*Concentration of hog cholera viral substance from spleen tissue*

995 gm. spleen tissue (from infected hogs sacrificed 7 days after inoculation with hog cholera virus) were ground by passing through a meat grinder two times, and 2000 cc. of physiological saline was added to the ground spleen tissue in a stainless steel container. 30 gm. filter paper scraps were added to the spleen-saline mixture, and this material was stirred for one hour (at room temperature) after which it was strained through several thicknesses of cheese cloth, and the remaining pulp was pressed for collection of additional fluid. Total fluids collected, 2500 cc.—pH 6.8. The collected fluid or "extract" was cooled to 0° C. and methyl alcohol cooled to −10° C. was slowly added with stirring. The volume of methyl alcohol added was 1070 cc. so that the alcohol concentration was finally 30%. The alcohol-extract mixture was allowed to stand for one hour, and then centrifuged in an angle head centrifuge held at −6° C. The precipitate collected from the alcohol extract mixture was resuspended in 0.01 M $NaH_2PO_4$ at pH 6.2 and again centrifuged at 0° C., and the collected precipitate suspended in sufficient saline to make 2900 cc. of suspension, a volume equivalent to about three times the weight of the original spleen tissue. The presence of hog cholera viral substance in the final suspension is demonstrated by inoculation tests on susceptible swine.

The following table contains the results of the titrations of hog cholera virus in the original spleen tissue suspension and in the purified suspension obtained after processing in accordance with the above procedure.

| Pig No. | Inoculum | Dilution | Dose, cc. | Date | Result |
| --- | --- | --- | --- | --- | --- |
| 4521 | Original tissue suspension (1-3 tissue dilution). | 1-30,000 | 1 | 3/11/49 | Survived. |
| 4519 | do | 1-15,000 | 1 | 3/11/49 | Died, Cholera. |
| 4526 | Final Purified suspension (3 times original tissue weight). | [1] 1-22,500 | 1 | 3/11/49 | Do. |

[1] Highest dilution of concentrate tested.

The titration tests show that the original tissue titer is between 1-15,000 and 1-30,000. The purified virus containing precipitate brought back to same volume as original tissue-saline mixture has titer of at least 1-22,500. This indicates approximately complete recovery of virus from the original spleen tissue.

The concentrated suspension of live purified virus was converted into a killed virus vaccine by being exposed in a film of about 0.13 mm. thickness to ultra-violet rays of 2537 A. wavelength for a period of about 10 seconds at a radiant intensity of about 6 milliwatts.

The following table contains data relating to the antigentic potency test of concentrated, purified hog cholera virus inactivated by ultra-violet irradition.

hog cholera have been processed according to the conditions specifically illustrated to result in the production of effective hog cholera vaccines. One tissue mixture employed contained liver, spleen, kidney, and muscular tissues in the same proportions in which they occurred in the hog carcass.

Various methods have been employed in the past for the production of and the irradiation of liquid films and our invention is not limited to any particular method. However, we prefer to use a method employing a rapidly rotating vertically disposed cylinder onto the inside upper wall of which the concentrated virus suspension is introduced at a controlled rate to produce a downward flowing film, and subjecting this film to an effective quantity of ultra-violet rays from a lamp positioned axially to the vertical cylinder.

Having thus described our invention, we claim:

1. A process of preparing a vaccine for immunizing swine against hog cholera comprising mixing finely divided infective hog cholera tissue with a saline solution, separating a liquid extract from the tissue pulp, cooling the liquid extract to a temperature of not higher than 5° C. and adding with agitation a cooled low aliphatic alcohol until the alcoholic concentration is from about 5% up to about 30% by volume, adjusting the temperature of the mixture to not higher than 5° C., maintaining this temperature until a precipitate forms, collecting the precipitated solids, resuspending the precipitate in a phosphate buffer solution at not higher than 5° C., recovering the purified virus containing precipitate, suspending the purified virus containing precipitate in sufficient saline to effect the desired degree of concentration, and exposing the final suspension in the form of a thin film to the action of ultra-violet rays of 2537 A. wavelength for a sufficient time and intensity to inactivate the hog cholera virus, sterilize the medium, and retain the antigenicity of the virus.

2. A process of preparing a vaccine for immunizing swine against hog cholera comprising, mixing finely divided infective hog cholera tissue with a physiological saline solution, separating a liquid extract from the tissue pulp, cooling the liquid extract to a temperature of not higher than 5° C. and adding with agitation a cooled lower aliphatic alcohol, until the alcoholic concentration is from about 5% up to about 30% by volume, adjusting the temperature of the mixture to not higher than 5° C., maintaining this temperature until a precipitate forms, collecting the precipitated virus and animal proteins, resuspending the precipitate in 0.01 M $NaH_2PO_4$ at not higher than 5° C., centrifuging the mixture to obtain a purified virus containing precipitate, suspending

| Pig No. | Vaccine | Dose,[1] cc. | No. Dose | Vaccination date | Exposure to live virus[1] | Exposure Date | Results |
| --- | --- | --- | --- | --- | --- | --- | --- |
| 6496 | Conc. irradiated vaccine. | 10 | 1 | 5/13/49 | 2 cc. virulent hog cholera virus. | 6/10/49 | Remained well. |
| 6495 | do | 10 | 1 | 5/13/49 | do | 6/10/49 | Do. |
| 6497 | do | 10 | 1 | 5/13/49 | do | 6/10/49 | Do. |
| 6498 | do | 10 | 1 | 5/13/49 | do | 6/10/49 | Do. |
| 6499 | do | 10 | 1 | 5/13/49 | do | 6/10/49 | Do. |
| 6500 | do | 10 | 1 | 5/13/49 | do | 6/10/49 | Do. |
| 6478 | Control | 0 | 0 | 0 | do | 6/10/49 | 13 days, died, cholera. |
| 6479 | do | 0 | 0 | 0 | do | 6/10/49 | 12 days, died, cholera. |

[1] Administered subcutaneously.

The above results show that the vaccine contained no live virus since none of the test animals sickened after receiving the 10 cc. dose on May 13, 1949. The results also show that the vaccine possessed high antigenic potencies since none of the vaccinated anicals developed hog cholera symptoms when dosed with 2 cc. of virulent hog cholera blood virus on May 10, 1949. On the other hand, the control animals following the doses of virulent hog cholera blood virus sickened and died of hog chlora.

Mixtures of tissues obtained from swine infected with the purified virus containing precipitate in sufficient saline to effect the desired degree of concentration, and exposing the final suspension in the form of a thin film to the action of ultra-violet rays of 2537 A. wavelength for a sufficient time and intensity to inactivate the hog cholera virus, sterilize the medium, and retain the anti-genicity of the virus.

3. A process of preparing a vaccine for immunizing swine against hog cholera comprising mixing finely divided infective hog cholera tissue with a saline solution, separating a liquid extract from the tissue pulp, cooling the liquid extract to a temperature of not higher than 5° C. and adding with agitation cooled methyl alcohol until the alcoholic concentration is from about 5% up to about 30% by volume, adjusting the temperature of the mixture to not higher than 5° C., maintaining this temperature until a precipitate forms, collecting the precipitated solids, resuspending the precipitate in a phosphate buffer solution at not higher than 5° C., recovering the purified virus containing precipitate, suspending the purified virus containing precipitate in sufficient saline to effect the desired degree of concentration, and exposing the final suspension in the form of a thin film to the action of ultra-violet rays of 2537 A. wavelength for a sufficient time and intensity to inactivate the hog cholera virus, sterilize the medium, and retain the antigenicity of the virus.

4. A process of preparing a vaccine for immunizing swine against hog cholera comprising, mixing finely divided infective hog cholera tissue with a physiological saline solution, separating a liquid extract from the tissue pulp, cooling the liquid extract to a temperature of not higher than 5° C. and adding with agitation cooled methyl alcohol until the alcoholic concentration is from about 5% up to about 30% by volume, adjusting the temperature of the mixture to not higher than 5° C., maintaining this temperature until a precipitate forms, collecting the precipitated virus and animal proteins, resuspending the precipitate in 0.01 M $NaH_2PO_4$ at not higher than 5 C., centrifuging the mixture to obtain a purified virus containing precipitate, suspending the purified virus containing precipitate in sufficient saline to effect the desired degree of concentration, and exposing the final suspension in the form of a thin film to the action of ultra-violet rays of 2537 A. wavelength for a sufficient time and intensity to inactivate the hog cholera virus, sterilize the medium, and retain the antigenicity of the virus.

5. A process of preparing a vaccine for immunizing swine against hog cholera comprising mixing finely divided infective hog cholera tissue with a physiological saline solution, separating a liquid extract from the tissue pulp, cooling the liquid extract to a temperature of about 0° C. and adding with agitation methyl alcohol, cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., recovering the purified virus containing precipitate, suspending the purified virus containing precipitate in sufficient saline to effect the desired degree of concentration, and exposing the final suspension in the form of a thin film to the action of ultra-violet rays of 2537 A. wavelength for a period of about 10 seconds in a film of approximately 0.13 mm. thickness and employing a radiant intensity of about 6 milliwatts to inactivate the hog cholera virus, sterilize the medium, and retain the antigenicity of the virus.

6. A process of preparing a vaccine for immunizing swine against hog cholera, comprising mixing finely divided infective hog cholera spleen tissue with a physiological saline solution, separating a liquid extract from the tissue pulp, cooling the liquid extract to a temperature of about 0° C. and adding with agitation methyl alcohol, cooled to about −10° C., until the alcoholic concentration is about 30% by volume, adjusting the temperature of the mixture to about −6° C., maintaining this temperature for about 1–2 hours, collecting the precipitated solids, resuspending the precipitate in a phosphate buffer solution at about 0° C., recovering the purified virus containing precipitate, suspending the purified virus containing precipitate in sufficient saline to effect the desired degree of concentration, and exposing the final suspension in the form of a thin film to the action of ultra-violet rays of 2537 A. wavelength for a period of about 10 seconds in a film of approximately 0.13 mm. htickness and employing a radiant intensity of about 6 milliwatts to inactivate the hog cholera virus, sterilize the medium and retain the antigenicity of the virus.

References Cited in the file of this patent

UNITED STATES PATENTS

| | | |
|---|---|---|
| 1,246,059 | Couret | Nov. 13, 1917 |
| 2,421,382 | Levinson | June 3, 1947 |
| 2,506,345 | Cox | May 2, 1950 |

OTHER REFERENCES

Pollard, in Pros. Soc. Exptl. Biol. and Med., vol. 71, June 1949, pp. 290–293.

Boyd: Fundamentals of Immunology, pp. 93 and 94, 2nd ed. (1947).